US007362491B2

(12) United States Patent
Busick et al.

(10) Patent No.: US 7,362,491 B2
(45) Date of Patent: Apr. 22, 2008

(54) HEATED GLASS PANELS AND METHODS FOR MAKING ELECTRICAL CONTACT WITH ELECTRO-CONDUCTIVE FILMS

(75) Inventors: Steve Busick, Denver, CO (US); Gino Figurelli, Denver, CO (US)

(73) Assignee: Radiant Glass Industries, LLC, Denver, CO (US)

(*) Notice: Subject to any disclaimer, the term of this patent is extended or adjusted under 35 U.S.C. 154(b) by 253 days.

(21) Appl. No.: 11/352,005

(22) Filed: Feb. 10, 2006

(65) Prior Publication Data

US 2007/0188842 A1 Aug. 16, 2007

(51) Int. Cl.

| | |
|---|---|
| ***G02F 1/15*** | (2006.01) |
| ***G02F 1/153*** | (2006.01) |
| ***E06B 7/12*** | (2006.01) |
| ***H05B 3/00*** | (2006.01) |
| ***H01R 43/00*** | (2006.01) |
| ***B60L 1/02*** | (2006.01) |

(52) U.S. Cl. ...................... 359/265; 359/273; 359/275; 359/297; 359/894; 52/172; 29/611; 29/856; 219/203; 257/668; 257/728; 257/750; 257/753; 174/250; 174/257; 174/535

(58) Field of Classification Search ................ 359/265, 359/267, 268, 271, 273, 275, 292, 297, 894; 365/126; 349/86; 310/311, 365; 156/250, 156/305, 330; 219/203, 536, 543, 545; 29/25.35, 29/25.42, 611, 620, 528, 831, 846, 856; 257/737, 257/750, 753, 778, 676, 728, 668, 434, 435; 174/250, 254, 259, 257, 260, 520, 535; 205/777.5, 205/792; 52/172; 600/391, 396, 583; 606/32; 514/329, 946; 428/34, 38, 412, 461, 337; 430/66

See application file for complete search history.

(56) References Cited

U.S. PATENT DOCUMENTS 2,419,400 A * 4/1947 Haven ......................... 52/172

(Continued)

*Primary Examiner*—Loha Ben
(74) *Attorney, Agent, or Firm*—Bruce E. Dahl; Susan E. Chetlin; David J. McCrosky

(57) ABSTRACT

A heated glass panel assembly according to one embodiment of the invention may include a substrate having an electro-conductive film provided thereon. A conductor is positioned in contact with the electro-conductive film. A resilient material is positioned in contact with the conductor so that at least a portion of the conductor is located between the resilient material and the electro-conductive film. A retainer is positioned in contact with the resilient material so that at least a portion of the resilient material and at least a portion of the conductor are located between the retainer and the electro-conductive film. The retainer applies a compressive pressure to the resilient material which transfers at least a portion of the compressive pressure to the conductor to hold the conductor in contact with the electro-conductive film.

36 Claims, 3 Drawing Sheets

U.S. PATENT DOCUMENTS

| | | | | | |
|---|---|---|---|---|---|
| 3,180,781 | A | * | 4/1965 | Ryan et al. | 428/461 |
| 3,473,863 | A | * | 10/1969 | Lewis | 359/297 |
| 3,553,833 | A | * | 1/1971 | Friedrick et al. | 29/611 |
| 4,439,771 | A | | 3/1984 | Kume et al. | |
| 4,641,466 | A | | 2/1987 | Raninen et al. | |
| 4,699,471 | A | * | 10/1987 | Miyake et al. | 359/275 |
| 4,910,380 | A | | 3/1990 | Reiss et al. | |
| 5,057,667 | A | | 10/1991 | Bell et al. | |
| 5,260,549 | A | | 11/1993 | Garritano | |
| 5,324,374 | A | | 6/1994 | Harmand et al. | |
| 5,511,145 | A | | 4/1996 | Bailey et al. | |
| 5,661,086 | A | * | 8/1997 | Nakashima et al. | 257/668 |
| 5,709,055 | A | | 1/1998 | Levi | |
| 5,745,208 | A | * | 4/1998 | Grupp et al. | 349/153 |
| 5,804,882 | A | * | 9/1998 | Tsukagoshi et al. | 257/783 |
| 5,920,243 | A | * | 7/1999 | Ishikawa et al. | 333/204 |
| 6,011,244 | A | | 1/2000 | Castle et al. | |
| 6,034,331 | A | * | 3/2000 | Tsukagoshi et al. | 174/250 |
| 6,137,085 | A | | 10/2000 | Nakashima et al. | |
| 6,144,017 | A | | 11/2000 | Millett et al. | |
| 6,223,414 | B1 | | 5/2001 | Hodek et al. | |
| 6,392,217 | B1 | * | 5/2002 | Teranuma et al. | 250/208.1 |
| 6,393,768 | B1 | | 5/2002 | Roche et al. | |
| 6,512,183 | B2 | * | 1/2003 | Mitani et al. | 174/257 |
| 6,586,709 | B2 | | 7/2003 | Kim | |
| 6,675,474 | B2 | * | 1/2004 | Mitani et al. | 29/856 |
| 6,730,352 | B2 | | 5/2004 | Stachowiak | |
| 6,910,729 | B2 | | 6/2005 | Kraenzler et al. | |
| 6,949,720 | B1 | | 9/2005 | Munoz et al. | |
| 7,002,115 | B2 | | 2/2006 | Gerhardinger et al. | |
| 2003/0127452 | A1 | | 7/2003 | Gerhardinger et al. | |
| 2005/0115954 | A1 | | 6/2005 | Gerhardinger et al. | |
| 2005/0269312 | A1 | | 12/2005 | Gerhardinger | |

* cited by examiner

HEATED GLASS PANELS AND METHODS FOR MAKING ELECTRICAL CONTACT WITH ELECTRO-CONDUCTIVE FILMS

TECHNICAL FIELD

This invention generally relates to structures and methods for making electrical contact with electro-conductive films on substrates and more specifically to heated glass panels.

BACKGROUND

Heated glass panels are known in the art and are commonly used to reduce or prevent the formation of condensation or fog on the glass panels. For example, heated glass panels are commonly used in refrigerated merchandiser units of the type used in grocery stores to store and display refrigerated and frozen foods. Heated glass panels may also be used in other applications, such as bathroom mirrors and skylights, wherein it is desirable to reduce or eliminate the formation of condensation on the glass panels. Heated glass panels, typically in the form of windshields, also may be used in automobiles and aircraft in order to provide windshields that may be readily cleared of accumulated condensation.

While many different configurations for heated glass panels have been developed and are being used, a commonly used configuration involves at least one glass panel or "lite" having a transparent, electro-conductive surface coating or film formed thereon. Commonly used electro-conductive films include tin oxide, indium oxide, and zinc oxide, although other compositions are known and may be used as well. The electro-conductive film is not a perfect conductor, and typically possesses an electrical resistance in a range of tens to hundreds of ohms "per square." Thus, an electric current flowing in the electro-conductive film will result in the formation of heat in proportion to the resistance of the film and the square of the current flowing in the film.

While commonly used configurations for such heated glass panels work well were the amount of heat produced is modest, such as, for example, in applications wherein the formation of condensation is to be avoided, considerable problems arise in applications wherein greater amounts of heat are to be produced. For example, it has been recognized that heated glass panels could be used to advantage in residential and commercial applications to meet at least some, if not all, of the heating requirements of the buildings in which the heated glass panels are used. However, it has proven difficult to provide an electrical connection between the power source and the electro-conductive film that is capable of reliably providing the higher currents required to produce significant amounts of heat.

In a typical configuration, thin conductors or "bus bars" positioned along opposite edges of the glass panel are used to electrically connect the electro-conductive film to a source of electrical power. The bus bars typically comprise thin strips of metal foil that are placed in contact with the electro-conductive film. While bus bars formed from such thin metal foils have been used with success in low power applications (e.g., panel de-fogging), they are not capable of handling the higher currents involved in situations where the heated glass panels are to provide a significant amount of heat. While thicker conductors could be used, it has proven difficult to provide uniform contact between the thicker conductors and the electro-conductive film. For example, small gaps or spaces between the conductors and the film may result in uneven heating of the film. In addition, such small gaps or spaces may result in the formation of arcs or sparks between the conductors and the film, which can be deleterious to the film, the conductors, or both.

Partly in an effort to address some of these problems, systems have been developed in which the conductors or bus bars are deposited on the electro-conductive film by flame spraying. While such systems have been used to produce conductors capable of handling the higher currents required for higher power dissipation, they tend to be difficult to implement, requiring expensive equipment and highly trained personnel. In addition, thickness variations in the sprayed-on metal coating may create hot spots and non-uniformities in the electrical current in the film, both of which can adversely affect the performance of the system.

SUMMARY OF THE INVENTION

A assembly according to one embodiment of the invention may include a substrate having an electro-conductive film provided thereon. A conductor is positioned in contact with the electro-conductive film. A resilient material is positioned in contact with the conductor so that at least a portion of the conductor is located between the resilient material and the electro-conductive film. A retainer is positioned in contact with the resilient material so that at least a portion of the resilient material and at least a portion of the conductor are located between the retainer and the electro-conductive film. The retainer applies a compressive pressure to the resilient material which transfers at least a portion of the compressive pressure to the conductor to hold the conductor in contact with the electro-conductive film.

A method for making electrical contact with an electro-conductive film provided on a substrate may comprise: Providing a length of conductor; positioning the length of conductor on the electro-conductive film; positioning a resilient material over at least a portion of the conductor so that the at least a portion of the conductor is located between the resilient material and the electro-conductive film; and positioning a retainer over at least a portion of the resilient material so that the at least a portion of the resilient material and the at least a portion of the conductor are located between the retainer and the electro-conductive film, the retainer applying a compressive pressure to the resilient material, the resilient material transferring at least a portion of the compressive pressure to the conductor to hold the conductor in contact with the electro-conductive film.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
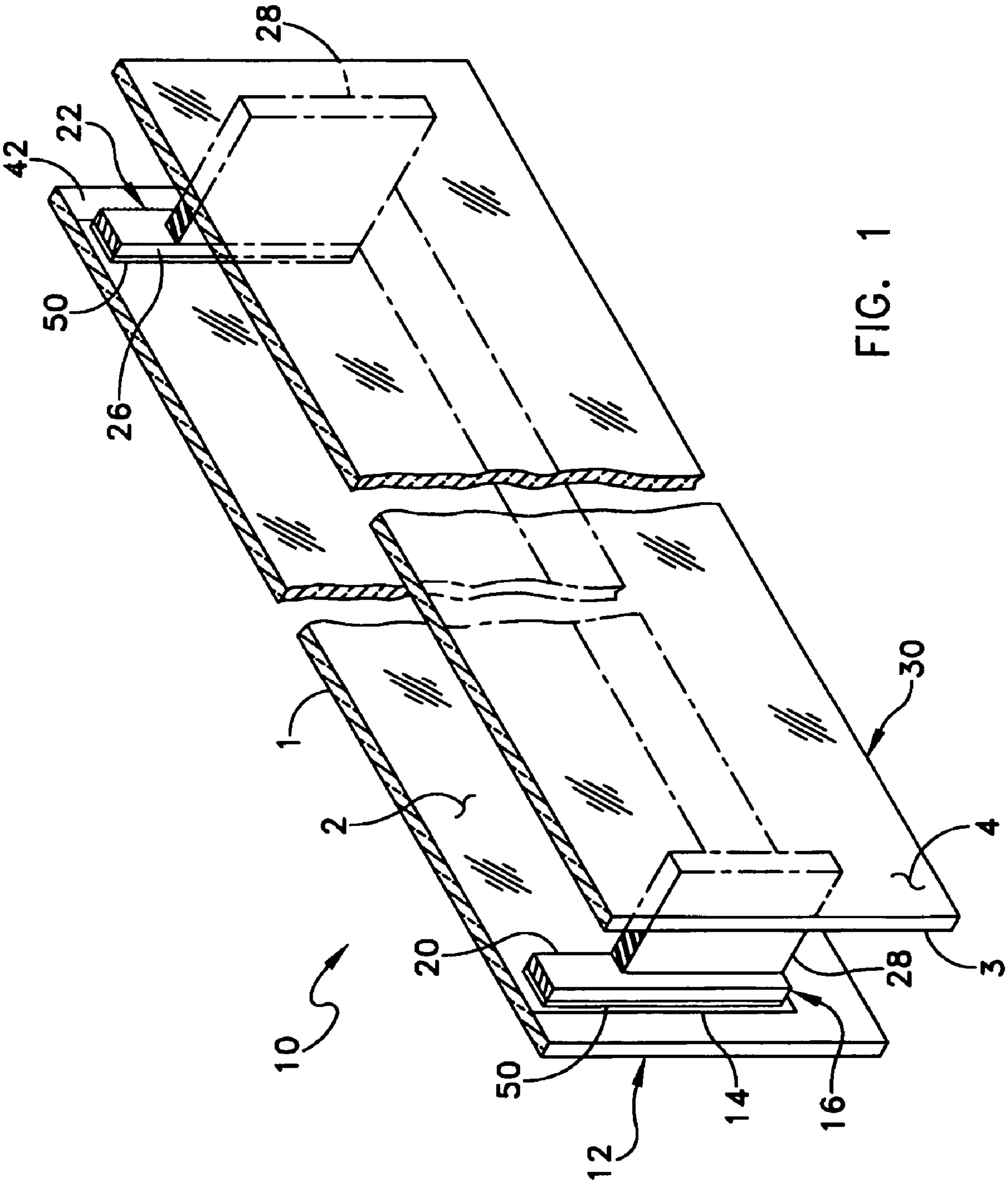
FIG. 1 is a perspective view of a portion of a heated glass panel according to one embodiment of the present invention.
Figure 2:
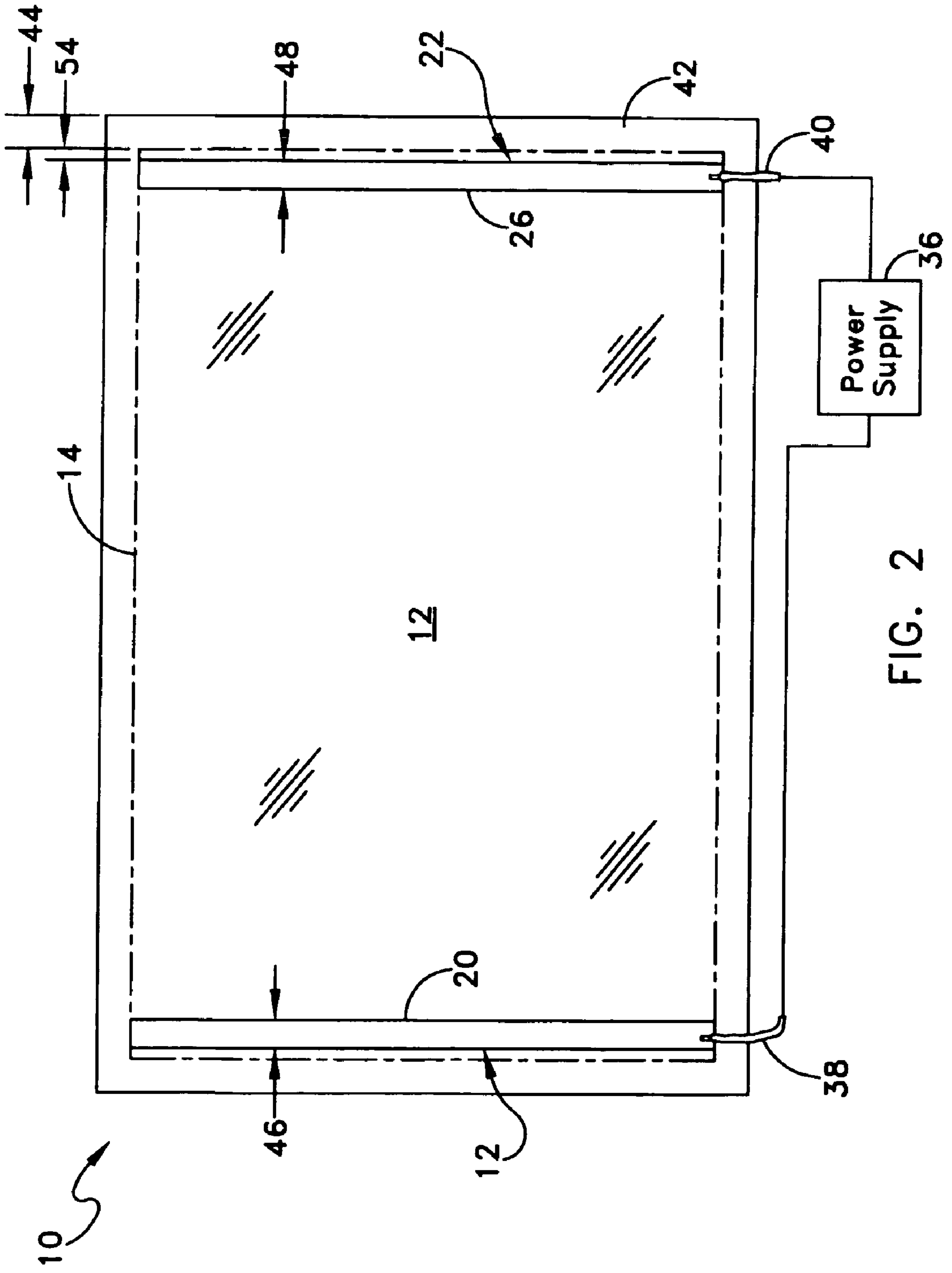
FIG. 2 is a plan view of the heated glass panel of FIG. 1 showing one configuration of the conductors that may be used to electrically connect the electro-conductive film and power supply.
Figure 3:
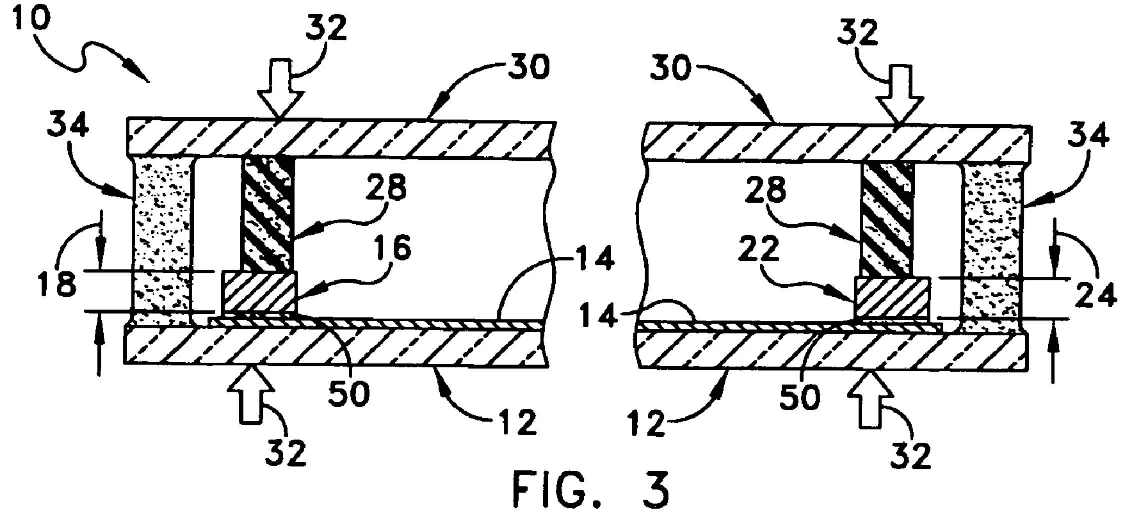
FIG. 3 is an enlarged cross-sectional view in elevation of opposed edge portions of one embodiment of a heated glass panel.

One embodiment of a heated glass panel 10 according to the teachings provided herein is best seen in FIGS. 1-3 and may comprise a first glass sheet 12 having an electro-conductive film 14 provided thereon. A first conductor 16 or bus bar is positioned at a first location 20 on the electro-conductive film 14. A second conductor 22 is positioned at a second location 26 on the electro-conductive film 14, as best seen in FIG. 2. A resilient material 28 is positioned on the first and second conductors 16 and 22. A second glass sheet 30 is positioned on the resilient material 28 in the manner best seen in FIG. 3, so that the resilient material 28 and conductors 16, 22 are sandwiched between the first and second glass sheets 12 and 30. The first and second glass sheets 12 and 30 are held together so that they exert a compressive pressure (illustrated by arrows 32) on the resilient material 28 and the first and second conductors 16 and 22, thereby holding the first and second conductors 16 and 22 in substantially continuous contact with the electro-conductive film 14.

As will be described in greater detail herein, the first and second glass sheets 12 and 30 may be held together by any of a wide variety of means. For example, in one embodiment, the first and second glass sheets 12 and 30 are held together by an adhesive 34 adhered to the first and second glass sheets 12 and 30, as best seen in FIG. 3. Alternatively, other structures and methods may be used as well, as will be described in further detail below.

In one embodiment, the first and second conductors or bus bars 16 and 22 may comprise a generally solid, bar-like material having a rectangular cross-section, as best seen in FIG. 3. Alternatively, and as will be described in greater detail herein, other configurations are possible. Significantly, the first and second conductors or bus bars 16 and 22 do not comprise metallic "foils." As used herein, the term "foil" refers to materials having thicknesses less than about 0.15 mm (0.006 inches). Accordingly, thicknesses 18 and 24 of respective first and second conductors 16 and 22 should be at least about 0.15 mm, and typically considerably thicker than 0.15 mm. By way of example, in one embodiment, the respective thicknesses 18 and 24 of first and second conductors 16 and 22 are selected to be in a range of about 0.76 mm (0.030 inches) to about 2.1 mm (0.080 inches), with thicknesses of about 1.52 mm (0.060 inches) being preferred.

Referring now primarily to FIG. 2, the first and second conductors 16 and 22 may be electrically connected to a suitable power supply 36 via a pair of conductors or wire leads 38, 40. The wire leads 38 and 40 may be electrically connected to the respective first and second conductors 16 and 22 by any convenient means, such as, for example, by soldering. Power supply 36 may comprise any of a wide range of power supplies (e.g., AC or DC) suitable for supplying electrical power to the electro-conductive film 14 at the desired voltage and current. By way of example, in one embodiment, the power supply 36 comprises a low-voltage DC power supply for providing direct current (i.e., DC) power to the electro-conductive film 14 at a voltage of less than about 50 volts.

In operation, the power supply 36 provides an electrical current to the electro-conductive film 14, which becomes heated as a result of the electrical resistance of the electro-conductive film 14. The construction of the conductors or bus bars 16 and 22 as well as the arrangement used to hold them in contact with the electro-conductive film 14, allows them to deliver a substantial electrical current to the electro-conductive film 14, thereby allowing the heated glass panel to dissipate substantial quantities of heat (i.e., power). By way of example, in one embodiment, power densities on the order of hundreds of watts/square meter can be easily achieved with the methods and apparatus of the present invention. The increased power density allows the heated glass panel to be used to advantage in a wide range of applications where such higher power dissipations are desired or required.

In addition to providing for increased current delivery to the electro-conductive film 14, the conductors 16 and 22 provide substantially continuous electrical contact with the electro-conductive film 14 along the entire lengths of the conductors 16 and 22. The substantially continuous electrical contact along the full lengths of the conductors or bus bars 16 and 22 provides for increased current uniformity within the electro-conductive film 14 and also reduces or eliminates the likelihood that arcs or sparks will form between the conductors 16, 22 and the electro-conductive film 14.

Still yet other advantages are associated with the present invention include ease and economy of manufacture. The conductors or bus bars 16 and 22 are mechanically robust, thereby allowing them to be simply and easily applied during manufacture. In addition, the methods and apparatus of the present invention avoid the need for high-temperature deposition equipment, such as flame spraying equipment, which can be expensive and difficult to operate. Indeed, heated glass panels 10 in accordance with the teachings of the present invention may be readily fabricated in existing insulated glass panel manufacturing facilities and with existing personnel.

Having briefly described one embodiment of a heated glass panel according to the teachings of the present invention, as well as some-of its more significant features and advantages, various embodiments of heated glass panels and methods for making electrical contact with electro-conductive films will now be described in detail. However, before proceeding with the description, it should be noted that while the methods and apparatus of the present invention are shown and described herein as they could be implemented in the manufacture of dual pane heated glass panels of the type commonly used in residential and commercial applications, they could also be used to produce heated glass or ceramic panels for use in other applications, such as, for example, heated glass towel holders, heated glass substrates for food service applications, and others. Indeed, the methods and apparatus of the present invention may be utilized in any of a wide variety of other applications now known or that may be developed in the future wherein it is necessary to make electrical contact with electro-conductive films, as would become apparent to persons having ordinary skill in the art after having become familiar with the teachings provided herein. Consequently, the present invention should not be regarded as limited to the particular applications and embodiments shown and described herein.

Referring back now to FIGS. 1-3, one embodiment of a heated glass panel 10 may comprise a first glass sheet 12 having an electro-conductive film 14 deposited thereon. The glass sheet 12 forms a substrate for the electro-conductive film 14 and may comprise any of a wide range of materials, such as glasses and ceramics, suitable for the intended application. In the exemplary embodiment of a heated glass panel 10, the first glass sheet 12 may comprise non-tempered plate glass, although tempered plate glass may also be used as well.

Depending on the application, the electro-conductive film 14 may be deposited on one or both sides of glass sheet 12 and may comprise any of a wide range of coatings that are generally electrically conductive so that the passage of electric current therethrough will result in the formation of heat within the electro-conductive film 14. Suitable electro-conductive films 14 include, but are not limited to, films comprising tin oxide, indium oxide, and zinc oxide, although other types of electro-conductive films now known in the art or that may be developed in the future may be used as well. By way of example, in one embodiment, the electro-conductive film 14 comprises tin oxide.

The electro-conductive film 14 may be applied or deposited on the glass sheet 12 by any of a wide range of coating processes (e.g., physical vapor deposition (PVD), chemical vapor deposition (CVD), sputtering, etc.) well-known in the art and suitable for the particular substrate and material being deposited. The electro-conductive film 14 may also be deposited in any of a wide range of thicknesses to provide the desired degree of electrical resistance, as will be described in greater detail below. However, because processes for forming electro-conductive films of desired thicknesses on glass substrates are known in the art and could be readily provided by persons having ordinary skill in the art, the particular deposition process that may be utilized in one embodiment of the present invention will not be described in further detail herein.

Depending on its particular composition and thickness, the electro-conductive film 14 will have an electrical resistance in the range of tens to hundreds of ohms per square. In addition, if the electro-conductive film 14 is applied in a uniform thickness, the resistance will be uniform across the coated glass sheet 12. By way of example, in one embodiment wherein the electro-conductive film 14 comprises tin oxide, it is deposited at a thickness (e.g., in a range of about 250 nanometers (nm) to about 2500 nm or so) to result in an overall film resistance in a range of about 7 to about 12 ohms per square. Alternatively, of course films 14 having different thicknesses and different resistances maybe also be used, as would become apparent to persons having ordinary skill in the art after having become familiar with the teachings provided herein.

As is known, such electro-conductive films 14 also provide the glass 12 with insulating properties as well, and are commonly referred to as low-emissivity or "low-E" films. Consequently, a heated glass panel 10 incorporating one or more such films will also provide the advantages associated with low-E films, including lower heat loss (or gain) to (or from) the environment, as the case may be. Such a dual pane heated glass panel and may also be referred to herein as a "radiant insulated glass panel."

In order to reduce the likelihood that a user or some other conductive substance will come into contact with the electro-conductive film 14, particularly when used in a heated glass panel 10, it will usually be desired or required that the electro-conductive film 14 be deposited on a non-exposed portion of the heated glass panel 10. For example, in one embodiment wherein the heated glass panel 10 comprises a heated glass panel having two glass panels 12 and 30, it will be generally desirable to provide the electro-conductive film 14 on one of the internal surfaces (e.g., either (or both of) surface "2" or surface "3," in accordance with convention of numbering surfaces "1," "2," "3," and "4") of the heated glass panel 10. In addition, it may be necessary or desirable to ensure that the electro-conductive coating 14 does not extend to the edges of the glass sheet 12. For example, in the embodiment illustrated in FIG. 2, the electro-conductive coating 14 is removed from (or is not deposited onto) a perimeter region 42 around the glass sheet 12. The width 44 of the perimeter region 42 may be selected to be any convenient value that will provide the desired degree of safety. By way of example, in one embodiment, the width 44 of perimeter region 42 is about 12.7 mm (0.5 inches).

As already described, a pair of conductors 16 and 22 are utilized to electrically connect the electro-conductive film 14 to the power supply 36. More specifically, a first conductor or bus bar 16 is provided at a first location 20 on the electro-conductive film 14, whereas a second conductor or bus bar 22 is provided at a second location 26 on the electro-conductive film 14. Generally speaking, and in most applications, it will be desirable to position the first and second conductors 16 and 22 at opposite ends of the electro-conductive film 14 provided on glass panel 12, as best seen in FIG. 2. It is generally preferred, but not required, to position the conductors 16 and 22 so that they are inset somewhat from the edge of the electro-conductive film 14 by a spaced-distance 54. The spaced-distance 54 may comprise any of a wide range of spacings that may be required or desired for a particular application. Consequently, the present invention should not be regarded as limited to any particular spaced-distance 54. However, by way of example, in one embodiment, the spaced-distance 54 is about 4.78 mm (0.188 inches).

As mentioned, the conductors or bus bars 16 and 22 may be placed at opposite ends of the electro-conductive film 14. If the electro-conductive film 14 comprises a square configuration, the first and second conductors 16 and 22 may be positioned on either pair of opposed ends of the square. Alternatively, if the overall shape of the heated glass panel 10 (i.e., electro-conductive film 14) is rectangular, then it will generally be desirable to place the first and second conductors 16 and 22 along the short ends of the rectangular glass panel 10, although this is not required. Indeed, whether the first and second conductors 16 and 22 are placed on the short ends or the long ends of a rectangular glass panel 10 will depend on the overall resistance of the electro-conductive film 14, the voltage and current to be provided, as well as on the desired degree of power dissipation.

For example, for a desired power dissipation, the resistance (in ohms per square) of the electro-conductive film 14 will need to be greater if the first and second conductors 16 and 22 are positioned on the long ends of glass panel 12 than if they are placed on the short ends. Conversely, for a given film resistance and applied current, the power dissipation of the electro-conductive film 14 will be greater if the first and second conductors 16 and 22 are positioned on the long ends of the heated glass panel 10.

Of course, the present invention is not limited to use with electro-conductive films 14 (i.e., glass panels 10) having rectangular configurations, but could be used with other configurations, such as configurations having curved or irregular shapes, by simply shaping the conductors to conform to the particular shape of the film 14 or substrate (i.e., first glass sheet 12). However, because persons having ordinary skill in the art will readily recognize how to apply the teachings of the present invention to such other configurations after having become familiar with the teachings provided herein, the details of such other configurations will not be described in further detail herein.

Referring now primarily to FIGS. 2 and 3, in one embodiment, each of the first and second conductors 16 and 22 may comprise a generally solid, bar-like configuration having a rectangular cross-section. Alternatively, other configurations are possible. For example, in another embodiment, each of the conductors 16 and 22 may comprise a generally solid, rod-like configuration having a circular cross-section. The respective thicknesses 18 and 24 of first and second conductors 16 and 22 should be selected so that they do not comprise "foils." That is, the respective thickness 18 and 24 should be at least about 0.15 mm (0.006 inches). Indeed, it is generally preferred that the thicknesses 18 and 24 of conductors 16 and 22 be substantially greater than that associated with foils. For example, the thicknesses 18 and 24 of respective conductors 16 and 22 may be in a range of about 0.76 mm (0.030 inches) to about 2.1 mm (0.080 inches), with thicknesses of about 1.52 mm (0.060 inches) being preferred. First and second conductors 16 and 22 having such increased thicknesses provides them with increased current handling capabilities and mechanical strength, which may be advantageous during manufacture. In addition, the relatively thick conductors 16 and 22 allow wire leads 38 and 40 to be readily attached to the conductors 16 and 22 by conventional means (e.g., by crimping or by soldering).

Referring back now to FIG. 2, the widths 46 and 48 of respective conductors 16 and 22 may be selected so that the conductors 16 and 22 can conduct the expected current to be applied to the electro-conductive film 14 without excessive voltage drop along the lengths of the conductors. Generally speaking, the selection of the widths 46 and 48 will depend to some extent on the thicknesses (e.g., 18 and 24, FIG. 3) of the corresponding conductors 16 and 22. For example, it may be desirable to provide thinner conductors 16 and 22 with increased widths 46 and 48 in order to minimize the voltage drop. In addition, the widths 46 and 48 may be selected to provide the conductors 16 and 22 with the desired mechanical properties, such as strength and ease of handling during manufacture. Consequently, the present invention should not be regarded as limited to first and second conductors 16 and 22 having any particular widths 46 and 48. However, by way of example, in one embodiment, the widths 46 and 48 are selected to be about 6.35 mm (0.25 inches). Of course, the respective lengths of the first and second conductors 16 and 22 should be substantially the same as the length of the electro-conductive film 14 to be contacted, and will generally be co-extensive with the length of the electro-conductive 14 provided on glass sheet 12, as best seen in FIG. 2.

The first and second conductors 16 and 22 may be fabricated from any of a wide range of electrical conductors, such as, for example, copper, silver, gold, aluminum, and various alloys of these metals. However, the material selected should be compatible with the particular electro-conductive film 14 so as to avoid corrosion or other undesired chemical reactions between the electro-conductive film 14 and conductor material. By way of example, in one embodiment, the conductors 16 and 22 comprise copper.

As already described, the conductors 16 and 22 may be placed in direct contact with the electro-conductive film 14. Alternatively, an electrically conductive adhesive 50 may be interposed between the film 14 and the first and second conductors 16 and 22. Generally speaking, the use of an electrically conductive adhesive 50 may simply manufacture, in that it will serve to hold the conductors 16 and 22 at the proper locations 20 and 26 on electro-conductive film 14 during manufacture. In addition, the electrically conductive adhesive 50 may improve the electrical contact between the electro-conductive film 14 and first and second conductors 16 and 22. The electrically conductive adhesive 50 may comprise any of a wide range of electrically conductive adhesives now known in the art or that may be developed in the future. Consequently, the present invention should not be regarded as limited to the use of any particular adhesive. However, by way of example, in one embodiment, the electrically conductive adhesive 50 comprises a acrylic adhesive material filled with an electrically conductive material (e.g., copper).

In one embodiment, the adhesive material 50 may comprise a double-sided electrically conductive adhesive tape having a conductive filler therein. Use of such a tape simplifies manufacture in that the tape can be pre-applied to the conductors 16 and 22, thereby allowing the conductors 16 and 22 to be readily adhered to the electro-conductive film 14 once the conductors 16 and 22 are properly positioned. Conversely, the electrically conductive tape may be applied first to the electro-conductive film 14, with the conductors 16 and 22 being later adhered to the tape. Any of a wide range of electrically conductive tapes now known in the art or that may be developed in the future may be used for this purpose. Consequently, the present invention should not be regarded as limited to any particular adhesive tape material. However, by way of example, in one embodiment, the electrically conductive adhesive tape that may be utilized for adhesive 50 comprises an electrically-conductive adhesive transfer tape available from 3M of St. Paul, Minn. (US) as product No. 9713.

Figure 4:
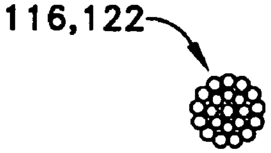
FIG. 4 is an enlarged cross-sectional view in elevation of a stranded wire conductor.
Figure 5:
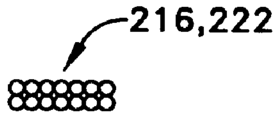
FIG. 5 is an enlarged cross-sectional view in elevation of a braided wire conductor.

In addition to comprising substantially solid, bar-like materials, the first and second conductors 16 and 22, or either one of them, may comprise other configurations as well. For example, in another embodiment, first and second conductors may comprise stranded wire conductors 116 and 122 having a substantially circular cross-section, as best seen in FIG. 4. In still another embodiment, first and second conductors may comprise braided wire conductors 216, 222 having a substantially rectangular cross-section, as illustrated in FIG. 5. The sizes (e.g., gauges) of such stranded wire conductors should be selected to provide the desired degree of current handling capability with minimal voltage drop, as already described for the solid, bar-like conductors 16 and 22. Generally speaking, if such stranded wire conductors are to be used, it will be preferable to also utilize an electrically conductive adhesive 50 (e.g., in the form of a double-sided electrically-conductive adhesive transfer tape) to ensure substantially continuous electrical contact along the length of the electro-conductive film 14.

A resilient material 28 is positioned adjacent the first and second conductors 16 and 22, as best seen in FIG. 3. As briefly described above, the resilient material 28 serves as a medium through which the compressive pressure 32 is applied to the conductors 16 and 22. As such, the resilient material 28 may comprise any of a wide range of materials, such as thermoset silicone foam, suitable for this purpose. In addition, in an embodiment wherein the heated glass panel 10 comprises an insulated double pane glass panel, as illustrated in FIG. 1, the resilient material 28 also provides a seal between the environment and the space defined between the two glass panels 12 and 30. In this particular application, resilient material 28 may comprise a silicone foam material having a desiccant provided therein to absorb any moisture that may be contained between the two glass panels 12 and 30, although the presence of a desiccant is not required. By way of example, in one embodiment, the resilient material 28 may comprise a thermoset silicone foam available from Edgetech I.G., Inc. and sold under the registered trademark "Super Spacer."

A second glass sheet or retainer 30 is positioned on the resilient material 28 in the manner best seen in FIG. 3 so that the resilient material 28 and conductors 16 and 22 are sandwiched between the first and second glass sheets 12 and

30. In the example illustrated in FIGS. 1-3, the second glass sheet 30 not only functions as a retainer, but also serves as the second pane of the dual pane radiant insulated glass panel 10. As such, and depending on the desired thermal properties, the second glass sheet 30 may also be provided with an electro-conductive coating (not shown) thereon which, in this example, would function as a "low-E" coating and would not be used to provide any additional heating function, although it could.

The first and second glass sheets 12 and 30 are held together so that they exert a compressive pressure 32 on the resilient material 28 and the first and second conductors 16 and 22, thereby holding the first and second metallic conductors 18 and 22 in substantially continuous contact with the electro-conductive film 14. The compressive pressure 32 may comprise any of a wide range of pressures suitable for providing a reliable electrical contact between the electro-conductive film 14 and conductors 16 and 22. Consequently, the present invention should not be regarded as limited to any particular compressive pressure or range of compressive pressures. Generally speaking, however, lower compressive pressures 32 may be utilized if an adhesive 50 is interposed between the electro-conductive film 14 and conductors 16 and 22. Indeed, and depending on the application and the particular adhesive 50 utilized, it may be possible to eliminate entirely the compressive pressure 32 and rely instead on the bond created by electrically conductive adhesive 50. By way of example, in one embodiment wherein an adhesive 50 is interposed between the electro-conductive film 14 and the conductors 16 and 22, the compressive pressure 32 may be in a range of about $1.73\times10^3$ to about $2\times10^4$ newtons/square meter ($N/m^2$), about $1\times10^4$ $N/m^2$ preferred (about 0.25 to about 3 pounds per square inch (psi), about 1.5 psi preferred). Alternatively, other pressure ranges may be utilized depending on the particular application and materials used in construction, as would become apparent to persons having ordinary skill in the art after having become familiar with the teachings provided herein. Consequently, the present invention should not be regarded as limited to any particular compressive pressure or range of compressive pressures.

In one embodiment, the first and second glass sheets 12 and 30 are held together by an adhesive 34, as best seen in FIG. 3. In one example embodiment wherein the heated glass panel 10 comprises a portion of a dual pane radiant insulated glass panel, the adhesive 34 may comprise any of a wide range of adhesives commonly used in dual pane insulated glass systems and capable of maintaining the compressive pressure 32. Consequently, the present invention should not be regarded as limited to use with any particular type of adhesive. However, by way of example, in one embodiment, the adhesive 34 may comprise a butyl-based adhesive available from Delchem, Inc., of Wilmington, Del. (US), and sold under the name of "D-2000 Reactive Hot Melt Butyl."

Figure 6:
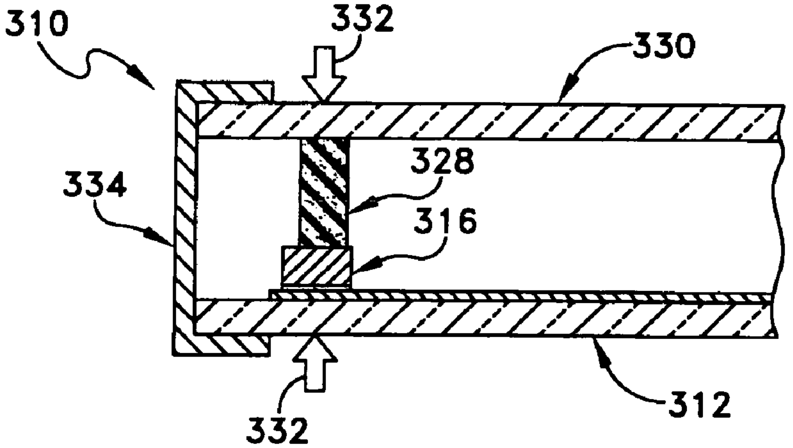
FIG. 6 is an enlarged cross-sectional view in elevation of an edge portion of another embodiment of a heated glass panel.

As mentioned above, other embodiments of the heated glass panel 10 may utilize other means for holding together the first and second glass sheets 12 and 30. For example, in another embodiment 310, first and second glass sheets 312 and 330 could be held together by a frame member 334, as best seen in FIG. 6. Frame member 334 is sized to maintain the desired compressive pressure 332 on resilient material 328 and conductor 316.

Figure 7:
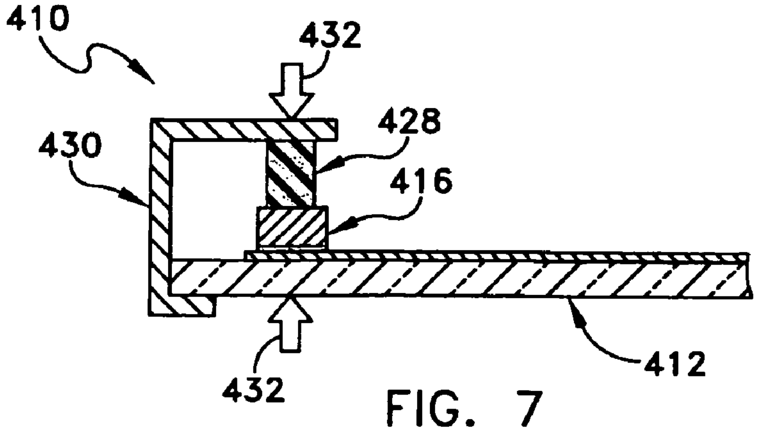
FIG. 7 is an enlarged cross-sectional view in elevation of an edge portion of yet another embodiment of a heated glass panel.

In still another embodiment 410, illustrated in FIG. 7, a first glass sheet or substrate 412 may be used alone, i.e., not in conjunction with a second glass sheet). Instead, a retainer 430 may be used to apply the desired compressive pressure 432 on resilient material 428 and conductor 416 in the manner already described.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A heated glass panel, comprising:

a first glass sheet having an electro-conductive film provided thereon;

a first conductor positioned at a first location on the electro-conductive film;

a second conductor positioned at a second location on the electro-conductive film;

a resilient material positioned on at least said first and second conductors so that said first and second conductors are located between said resilient material and said electro-conductive film;

a second glass sheet positioned on said resilient material so that said first and second glass sheets are in generally parallel, spaced-apart relation; and means for holding said first and second glass sheets together so that said first-and second glass sheets exert a compressive pressure on said resilient material and said first and second conductors, said compressive pressure holding said first and second conductors in contact with said electro-conductive film.

2. The heated glass panel of claim 1, further comprising an electrically conductive adhesive positioned between said first and second conductors and the electro-conductive film.

3. The heated glass panel of claim 1, wherein said resilient material comprises silicone foam.

4. The heated glass panel of claim 1, wherein said means for holding said first and second glass sheets together comprises an adhesive adhered between said first and second glass sheets.

5. The heated glass panel of claim 4, wherein said adhesive comprises a butyl-based material.

6. The heated glass panel of claim 1, wherein means for holding said first and second glass sheets together comprises a frame positioned around at least a portion of a perimeter of said first and second glass sheets.

7. The heated glass panel of claim 1, wherein said first and second conductors comprise a generally elongate, bar-like configuration having a generally rectangular cross-section.

8. The heated glass panel of claim 1, wherein said first and second conductors comprise braided wire strands.

9. The heated glass panel of claim 1, wherein said first and second conductors comprise a generally elongate, rod-like configuration having a generally circular cross-section.

10. The heated glass panel of claim 1, wherein said first and second conductors comprise stranded wire.

11. The heated glass panel of claim 1, wherein said first and second conductors comprise one or more materials selected from the group consisting of copper, silver, gold, aluminum, and alloys thereof.

12. The heated glass panel of claim 1, wherein said first and second conductors have respective thicknesses greater than about 0.15 mm.

13. The heated glass panel of claim 12, wherein said first and second conductors have respective thicknesses in a range of about 0.76 mm to about 2.1 mm.

14. A method for making a heated glass panel, comprising:

providing a first glass sheet having an electro-conductive film provided thereon;

positioning a first conductor at a first location on the electro-conductive film;

positioning a second conductor at a second location on the electro-conductive film;

positioning a resilient material on at least portions of said first and second conductors so that said first and second conductors are located between said resilient material and said electro-conductive film;

positioning a second glass sheet on said resilient material so that said first and second glass sheets are in generally parallel, spaced-apart relation; and securing said first and second glass sheets together so that said first and second glass sheets exert a compressive pressure on said resilient material and said first and second conductors, said compressive pressure holding said first and second conductors in contact with said electro-conductive film.

15. The method of claim 14 further comprising attaching a first wire lead to said first conductor and attaching a second wire lead to said second conductor.

16. The method of claim 14, wherein securing said first and second glass sheets together further comprises:

urging the first and second glass sheets together to exert the compressive pressure; and applying an adhesive between said first and second glass sheets.

17. The method of claim 14, wherein securing said first and second glass sheets together further comprises mounting said first and second glass sheets within a frame.

18. The method of claim 14, wherein positioning said first and second conductors at respective first and second locations on the electro-conductive film further comprises placing an adhesive between said first and second conductors and the electro-conductive film.

19. The method of claim 18, wherein placing an adhesive between the electro-conductive film and said first and second conductors comprises positioning an electrically conductive tape between said first and second conductors and the electro-conductive film.

20. The method of claim 19, wherein positioning an electrically conductive tape between said first and second conductors and the electro-conductive film comprises adhering a first side of the electrically conductive tape to said first and second conductors and adhering a second side of the electrically conductive tape to the electro-conductive film.

21. An assembly, comprising:

a substrate having an electro-conductive film provided on at least one side of said substrate;

a conductor positioned in contact with the electro-conductive film;

a resilient material positioned in contact with said conductor so that at least a portion of said conductor is located between said resilient material and the electro-conductive film; and a retainer positioned in contact with said resilient material so that at least a portion of said resilient material and at least a portion of said conductor are located between said retainer and the electro-conductive film, said retainer applying a compressive pressure to said resilient material, said resilient material transferring at least a portion of the compressive pressure to said conductor to hold said conductor in contact with the electro-conductive film.

22. The assembly of claim 21, wherein said conductor comprises one or more selected from the group consisting of copper, silver, gold, aluminum, and alloys thereof.

23. The assembly of claim 21, wherein said conductor has a thickness greater than about 0.15 mm.

24. The assembly of claim 21, wherein said substrate comprises glass.

25. The assembly of claim 24, wherein said retainer comprises glass.

26. The assembly of claim 25, further comprising an adhesive material provided between said glass substrate and said glass retainer, said adhesive material holding together said glass substrate and said glass retainer.

27. The assembly of claim 26, wherein said adhesive material comprises a butyl-based adhesive material.

28. The assembly of claim 21, further comprising an electrically conductive adhesive positioned between said conductor and said electro-conductive film.

29. The assembly of claim 28, wherein said electrically conductive adhesive comprises an electrically conductive adhesive transfer tape.

30. The assembly of claim 21, wherein said resilient material comprises silicone foam tape.

31. A method for making electrical contact with an electro-conductive film provided on a substrate, comprising:

providing a length of conductor;

positioning the length of conductor on the electro-conductive film;

positioning a resilient material over at least a portion of the conductor so that the at least a portion of the conductor is located between the resilient material and the electro-conductive film; and positioning a retainer over at least a portion of the resilient material so that the at least a portion of the resilient material and the at least a portion of the conductor are located between the retainer and the electro-conductive film, the retainer applying a compressive pressure to the resilient material, the resilient material transferring at least a portion of the compressive pressure to the conductor to hold the conductor in contact with the electro-conductive film.

32. The method of claim 31, wherein positioning the length of conductor on the electro-conductive film further comprises placing an adhesive between the electro-conductive film and the conductor.

33. The method of claim 32, wherein placing an adhesive between the electro-conductive film and the conductor comprises positioning an electrically conductive tape between the electro-conductive film and the conductor.

34. The method of claim 33, wherein placing an electrically conductive tape between the electro-conductive film and the conductor comprises adhering a first side of the electrically conductive tape to the conductor and adhering a second side of the electrically conductive tape to the electro-conductive film.

35. The method of claim 31, wherein positioning a retainer comprises:

placing a transparent material over the resilient material;

moving the transparent material and substrate together to compress the resilient material; and fixing together the transparent material and substrate.

36. An assembly, comprising:

a substrate having an electro-conductive film provided on at least one side of said substrate;

a conductor having a thickness of at least about 0.15 mm; and an electrically conductive adhesive positioned between said conductor and said electro-conductive film.

* * * * *